United States Patent
Kuo et al.

(10) Patent No.: US 7,889,616 B2
(45) Date of Patent: Feb. 15, 2011

(54) POLARIZATION STATE DETECTOR SYSTEMS AND METHODS FOR READ-OUT OF MULTILEVEL ORIENTED NANO-STRUCTURE OPTICAL MEDIA

(75) Inventors: David S. Kuo, Palo Alto, CA (US); Neil Deeman, Alamo, CA (US); Shih-Fu Lee, Fremont, CA (US); Koichi Wago, Sunnyvale, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 1207 days.

(21) Appl. No.: 11/366,569

(22) Filed: Mar. 3, 2006

(65) Prior Publication Data
US 2007/0206480 A1 Sep. 6, 2007

(51) Int. Cl.
*G11B 7/00* (2006.01)
(52) U.S. Cl. .................. 369/110.01; 369/110.02; 369/112.16; 369/112.17
(58) Field of Classification Search ............ 369/112.17, 369/110.01, 110.02
See application file for complete search history.

(56) References Cited

U.S. PATENT DOCUMENTS

| | | | |
|---|---|---|---|
| 5,012,460 A | | 4/1991 | Popovich et al. |
| 5,132,959 A | * | 7/1992 | Ishika ................ 369/112.17 |
| 5,325,350 A | * | 6/1994 | Morimoto et al. ...... 369/110.04 |
| 5,436,883 A | * | 7/1995 | Sugiura ................ 369/109.02 |
| 5,450,376 A | * | 9/1995 | Matsumura et al. ...... 369/13.32 |
| 5,502,708 A | * | 3/1996 | Morimoto ............... 369/14 |
| 5,519,679 A | | 5/1996 | Gage |
| 5,555,538 A | * | 9/1996 | Yanagawa et al. ...... 369/110.01 |
| 5,666,344 A | | 9/1997 | Imaino et al. |
| 5,880,838 A | * | 3/1999 | Marx et al. ............. 356/498 |
| 5,905,700 A | | 5/1999 | Best et al. |
| 6,233,209 B1 | | 5/2001 | Verboom |
| 6,236,627 B1 | | 5/2001 | Verboom |
| 6,498,775 B1 | * | 12/2002 | Fan et al. ............... 369/94 |
| 2003/0156525 A1 | * | 8/2003 | Fan et al. ............... 369/110.04 |
| 2005/0213465 A1 | * | 9/2005 | Takeuchi ................ 369/59.11 |
| 2006/0028962 A1 | * | 2/2006 | Zachar et al. .......... 369/112.01 |

* cited by examiner

*Primary Examiner*—Wayne R Young
*Assistant Examiner*—Adam R Giesy

(57) ABSTRACT

A polarization detection system structured for optical read-out of disc-shaped optical data/information storage and retrieval media with surfaces comprised of pits or marks configured as multilevel oriented nano-structures (ONS) with varying pit or mark orientations and widths. The polarization detection system comprises: an optical beam source; a stage for mounting and rotating an optical disc medium about a central axis; at least one photodetector; a beam splitter positioned in an optical path between the source and stage, for directing an incident beam from the source onto an optical disc mounted on the stage and a return beam from the disc onto the photodetector; and an optical polarizer positioned in an optical path between the beam splitter and the at least one photodetector, for detection and analysis of changes in polarization of the return beam effected by variation of the orientation of the walls and/or widths of the pits or marks of the disc.

13 Claims, 8 Drawing Sheets

FIG. 1 (PRIOR ART)
Multi-States Encoding
Conventional Encoding
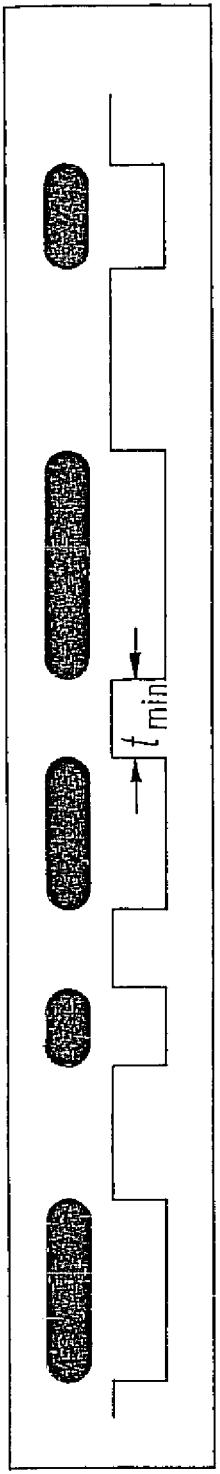
Multi-States Encoding
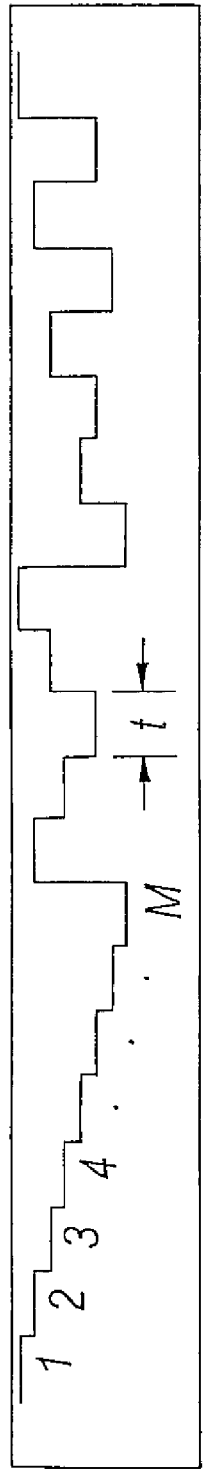
Areal density and data rate goes up by packing more information (M states) into one recording cell.

Oriented Nano-Structure (ONS) Technology

| CD | DVD | Blu-ray Disc | ONS Disc |
|---|---|---|---|
| λ=780 nm, NA=0.45 | λ=650 nm, NA=0.60 | λ=400 nm, NA=0.85 | λ=400 nm, NA=0.85 |
| 1.2 mm substrate | 0.6 mm substrate | 0.1 mm cover layer | 0.1 mm cover layer |
| 650 MB, 1.6 μm | 4.7 GB, 0.74 μm | 25 GB, 0.3 μm | 125 GB, 0.3 μm |
| 1st generation Audio 0.7 GB 1x: 1.2 Mb/s λ=780 nm NA=0.45 1.2 mm cover | 2nd generation SD Video 4.7/8.5 GB 1x: 11 Mb/s λ=650 nm NA=0.60 0.6 mm cover | 3rd generation HD Video 25/50 GB 1x: 36 Mb/s λ=405 nm NA=0.85 0.1 mm cover | 4th generation HD Compact Video 125 GB 1x: 180 Mb/s λ=405 nm NA=0.85 |

Enable 5x or more in storage capacity and data rate of optical discs with similar far-field optics of convention optical drive.

FIG. 2
(PRIOR ART)

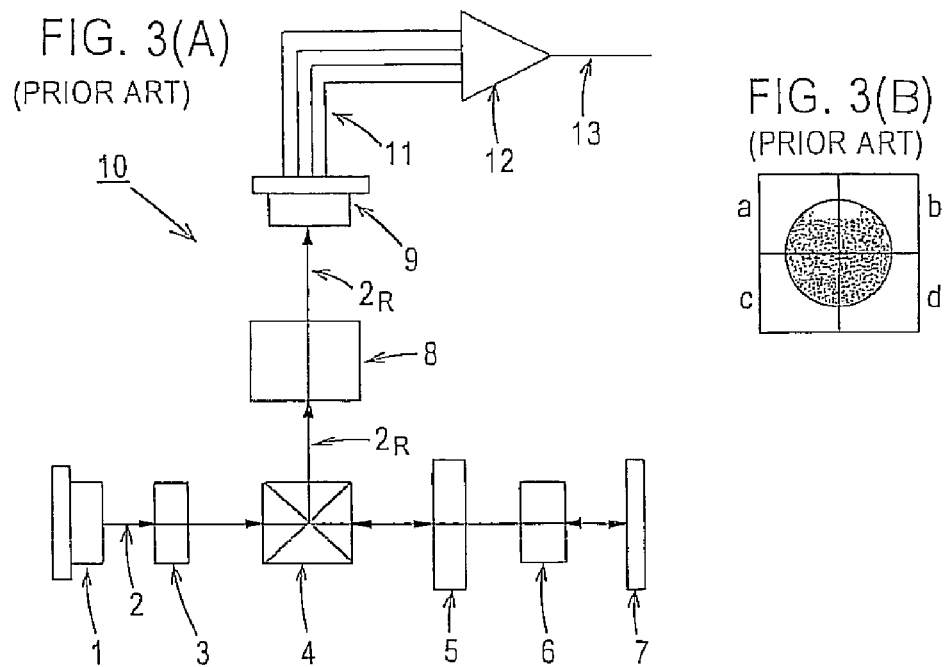
FIG. 3(A) (PRIOR ART)
FIG. 3(B) (PRIOR ART)
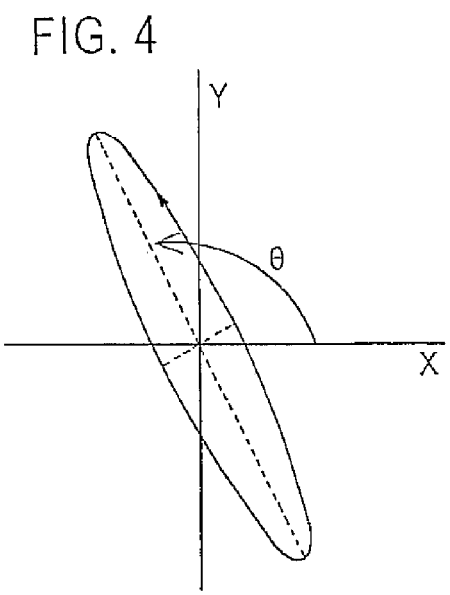
FIG. 4
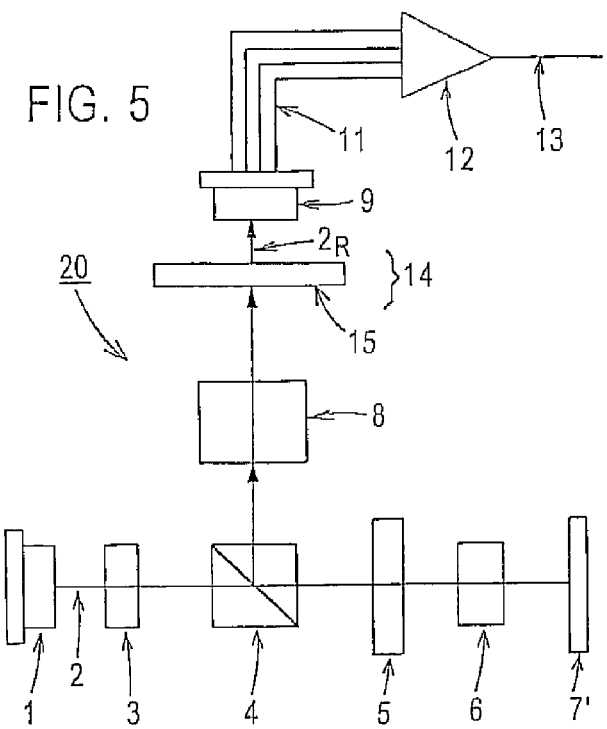
FIG. 5

POLARIZATION STATE DETECTOR SYSTEMS AND METHODS FOR READ-OUT OF MULTILEVEL ORIENTED NANO-STRUCTURE OPTICAL MEDIA

FIELD OF THE INVENTION

The present invention relates to methodology and technology for optical read-out of disc-shaped optical data/information storage and retrieval media comprised of pits or marks configured as multilevel oriented nano-structures (ONS). The invention has particular utility in the use of ONS-type optical media with ultra-high data storage capacities in excess of about 150 Gbytes for disc diameters comparable to those of currently available CD and DVD media.

BACKGROUND OF THE INVENTION

Oriented Nano-Structure ("ONS") optical media provide storage capacities/densities which are increased by a factor as high as about 5, relative to the currently available CD, DVD, HD-DVD, etc., optical disc media. Advantageously, such ONS media and systems are backward compatible with the CD, DVD, HD-DVD technologies, and are suitable for use as small form-factor discs such as are currently employed in personal audio/video devices, e.g., Game Boys®, iPODS®, etc.

Referring to FIG. 1, the upper illustration is a plan view of a data track (or recording cell) of a conventionally encoded optical medium, showing a pattern comprised of a plurality of elongated pits (dark areas) formed in the surface of the medium and the corresponding output pattern of a read head or photodetector which is produced by the pattern of pits, wherein $t_{min}$ indicates the minimum spacing between adjacent pits which limits the maximum data encoding density and reading rate for a given disc rotation speed.

Still referring to FIG. 1, the lower illustration shows the expected output pattern of a read head or photodetector of a multi-states encoded ONS medium, wherein the surface of the medium includes a data track (or recording cell) with a pattern of pits configured as multilevel oriented nano-structures. As is evident from a comparison of these illustrations, and noting that $t<t_{min}$, the areal recording density and data rate is significantly increased (i.e., $\geqq 5\times$) in the multi-states encoded ONS medium by packing more information (i.e., M states) into the recording cell, while advantageously allowing operation with far-field optics similar to those of conventional optical drives.

Adverting to FIG. 2, shown therein are cross-sectional system views and plan views of the encoded surfaces of conventional CD, DVD, Blu-Ray® media, as well as ONS media, along with associated performance characteristics and operating parameters of each of these media types. As before, it is evident that ONS media offer significantly increased areal recording density and data rate vis-à-vis the earlier generations of optical media by virtue of: (1) decreased spacing between adjacent data tracks; (2) the ability to widely vary the angles of the pit walls with respect to the data tracks, hence the encoding information; and (3) the increased pit density along each data track.

ONS technology possesses the potential for becoming significantly more valuable than conventional optical disc technology, since "write once" and/or "re-writable" ONS discs can attain data storage capacities in the 150-1,000 Gbyte range when in a 5.25 in. diameter format and are usable equally well for content delivery (as in the current CD and DVD markets) and archival storage and retrieval applications.

Conventional optical disc data/information recording and storage systems, e.g., employing read-only and writable CD, DVD, etc., media, rely on a structure comprised of elongated pits which extend in a down-track direction and have discrete lengths determined by the corresponding digital signal. The read-back signal is related to optical reflection changes which occur at the leading and trailing edges of the elongated pits.

FIG. 3(A) is a block diagram schematically illustrating the operating principle and layout of a typical optical system 10 utilized for providing a read-back signal corresponding to encoded data/information from conventional CD, DVD, etc. media, wherein: reference numeral 1 indicates a source of an incident beam of optical energy 2, e.g., a laser diode; reference numeral 3 indicates a collimating lens; reference numeral 4 indicates a beam splitting prism; reference numeral 5 indicates a quarter-wave plate; reference numeral 6 indicates an objective lens; reference numeral 7 indicates the optical disc; reference numeral 8 indicates optics for astigmatic focusing; reference numeral 9 indicates a quadrant-type photodetector (shown in more detail in the plan view of FIG. 3(B)); reference numeral 11 indicates output lines from each of the quadrants a, b, c, and d of the photodetector with corresponding output signals $I_a$, $I_b$, $I_c$, $I_d$; reference numeral 12 indicates a suitable amplifier, e.g., a DC coupled amplifier, for processing the output signals from lines 11; and reference numeral 13 indicates an output line from amplifier 12. Reference numeral $2_R$ indicates a beam of optical energy ("return beam") reflected from the encoded surface of optical disc 7 back to the beam splitting prism 4, whereat it is separated from the incident beam 2 and directed towards focusing optics 8 and photodetector 9.

In contrast with the conventional optical disc technology utilizing an optical system such as shown in FIG. 3, ONS discs utilize angularly oriented and/or width-modulated marks or pits for data/information encoding, and thus output signals from ONS media involve changes or shifts in the polarization angle or state of reflected ("return") light. However, since the output signal generated by ONS media is different from that of the conventional media, an optical system such as system 10 of FIG. 3 is not optimally designed for resolving changes in angles/orientations of reflected polarized light from the data marks or pits.

Accordingly, there exists a clear need for optical read-out systems designed and configured for optimally resolving changes in angles/orientations of reflected polarized light from the data marks or pits of ONS media.

SUMMARY OF THE INVENTION

An advantage of the present invention is an improved polarization detection system adapted for optical read-out of disc-shaped optical data/information storage and retrieval media with surfaces comprised of pits or marks configured as multilevel oriented nano-structures (ONS) with varying pit or mark orientations and/or widths.

Another advantage of the present invention is an improved method for performing optical read-out of disc-shaped optical data/information storage and retrieval media with surfaces comprised of pits or marks configured as multilevel oriented nano-structures (ONS) with varying pit or mark orientations and/or widths.

Additional advantages and other features of the present invention will be set forth in the description which follows and in part will become apparent to those having ordinary skill in the art upon examination of the following or may be learned from the practice of the present invention. The advantages may be realized and obtained as particularly pointed out in the appended claims.

According to an aspect of the present invention, the foregoing and other advantages are achieved in part by a polarization detection system structured for optical read-out of disc-shaped optical data/information storage and retrieval media with surfaces comprised of pits or marks configured as multilevel oriented nano-structures (ONS) with varying pit or mark orientations and/or widths, comprising:

(a) an optical beam source;

(b) a stage adapted for mounting and rotating an optical disc medium about a central axis;

(c) at least one photodetector;

(d) a beam splitter positioned in an optical path between the source and stage, for directing an incident beam from the source onto an optical disc mounted on the stage and a return beam from the disc onto the photodetector; and (e) an optical polarizer positioned in an optical path between the beam splitter and the at least one photodetector, for detection and analysis of changes in polarization of the return beam effected by variation of the orientation of the walls and/or widths of the pits or marks of the disc.

According to an embodiment of the present invention, the optical polarizer element comprises a linear polarizer which directs the return beam onto the photodetector which is adapted for providing an amplitude modulated output signal correlated to the variation of the orientation of the walls and/or widths of the pits or marks of the disc.

In accordance with another embodiment of the present invention, the optical polarizer comprises a polarizing beam splitter which divides the return beam into a pair of linearly polarized beams with a 90° difference in polarization angle, and each beam is directed therefrom onto a respective photodetector; whereas, according to yet another embodiment of the present invention, the optical polarizer comprises a polarizing beam splitter which divides the return beam into a pair of linearly polarized beams with a 45° difference in polarization angle, and each beam is directed therefrom onto a respective photodetector.

According to yet another embodiment of the invention, the optical polarizer comprises a non-polarizing beam splitter and first and second polarizing elements, the non-polarizing beam splitter adapted for dividing the return beam into first and second beams, the first beam directed through the first polarizing element having a first rotation axis and onto a first photodetector, the second beam directed through the second polarizing element having a second rotation axis and onto a second photodetector, the first and second rotation axes being oriented 45° apart, wherein the intensity of each of the first and second beams detected by the respective first and second photodetectors varies with the light polarization orientation of the return beam.

In accordance with still another embodiment of the present invention, the optical polarizer comprises first and second non-polarizing beam splitters and first, second, and third polarizing elements, the first and second non-polarizing beam splitters positioned in optical series, the first beam splitter adapted for receiving the return beam and dividing it into: (1) a first beam directed through the first polarizing element with a 120° rotation axis and onto a first photodetector, and (2) a second beam received by the second beam splitter; the second beam splitter adapted for dividing the second beam into third and fourth beams, the third beam directed through the second polarizing element with a 60° rotation axis and onto a second photodetector, and the fourth beam directed through the third polarizing element with a 0° rotation axis and onto a third photodetector, wherein the intensity of each of said first, third, and fourth beams detected by the respective first, second, and third photodetectors varies with the light polarization orientation of the return beam.

In accordance with a further embodiment of the present invention, the optical polarizer comprises a non-polarizing beam splitter and first and second polarizing beam splitters, the non-polarizing beam splitter adapted for receiving the return beam and dividing it into first and second beams respectively directed to the first and second polarizing beam splitters, the first polarizing beam splitter having an optical axis oriented at 45° to a horizontal position and directing first and second beams exiting therefrom onto respective first and second photodetectors, the second polarizing beam splitter having an optical axis oriented at 0° to a horizontal position and directing third and fourth beams exiting therefrom onto respective third and fourth photodetectors, wherein the intensity of each of the first, second, third, and fourth exiting beams detected by the respective first, second, third, and fourth photodetectors varies with the light polarization orientation of the return beam.

According to embodiments of the invention, the optical beam source comprises a laser; the at least one photodetector comprises a quadrant detector device; and the system further comprises:

(f) at least one lens for collimating and/or focusing of at least one of the beams; and (g) an amplifier with an input electrically connected to an output of the at least one photodetector.

Another aspect of the present invention is a method for performing optical read-out of disc-shaped optical data/information storage and retrieval media with surfaces comprised of pits or marks configured as multilevel oriented nano-structures (ONS) with varying pit or mark orientations and/or widths, comprising steps of:

(a) providing a system comprising:
   (i) an optical beam source;
   (ii) a stage mounting thereon an optical disc medium for rotation about a central axis;
   (iii) at least one photodetector;
   (iv) a beam splitter positioned in an optical path between the source and stage, for directing an incident beam from the source onto the optical disc and a return beam from the disc onto the photodetector; and
   (v) an optical polarizer positioned in an optical path between the beam splitter and the at least one photodetector, for detection and analysis of changes in polarization of the return beam effected by variation of the orientation of the walls and/or widths of the pits or marks of the disc; and (b) determining orientation and/or width of the pits or marks by correlation with modulation of the intensity of the return beam measured by the at least one photodetector.

According to an embodiment of the present invention, step (a) comprises providing a system wherein the optical polarizer comprises a linear polarizer which directs the return beam onto the photodetector adapted for providing an amplitude modulated output signal correlated to the variation of the orientation of the walls and/or widths of the pits or marks of the disc.

Another embodiment of the present invention is wherein step (a) comprises providing a system wherein the optical polarizer comprises a polarizing beam splitter which divides the return beam into a pair of linearly polarized beams with a 90° difference in polarization angle, and each beam is directed therefrom onto a respective photodetector; whereas, according to yet another embodiment of the present invention, step (a) comprises providing a system wherein the optical polarizer comprises a polarizing beam splitter which divides the return beam into a pair of linearly polarized beams with a 45° difference in polarization angle, and each beam is directed therefrom onto a respective photodetector.

According to further embodiments of the invention, step (a) comprises providing a system wherein the optical polarizer comprises a non-polarizing beam splitter and first and second polarizing elements, the non-polarizing beam splitter adapted for dividing the return beam into first and second beams, the first beam directed through the first polarizing element having a first rotation axis and onto a first photodetector, the second beam is directed through the second polarizing element having a second rotation axis and onto a second photodetector, the first and second rotation axes being oriented 45° apart; and step (b) comprises correlating the intensity of each of the first and second beams detected by the respective first and second photodetectors with the light polarization orientation of the return beam.

In accordance with still other embodiments of the present invention, step (a) comprises providing a system wherein the optical polarizer comprises first and second non-polarizing beam splitters and first, second, and third polarizing elements, the first and second non-polarizing beam splitters positioned in optical series, the first beam splitter adapted for dividing the return beam into: (1) a first beam directed through the first polarizing element with a 120° rotation axis and onto a first photodetector, and (2) a second beam received by the second beam splitter which divides it into third and fourth beams, the third beam directed through the second polarizing element with a 60° rotation axis and onto a second photodetector, and the fourth beam directed through the third polarizing element with a 0° rotation axis and onto a third photodetector; and step (b) comprises correlating the intensity of each of the first, third, and fourth beams detected by the respective first, second, and third photodetectors with the light polarization orientation of the return beam.

Still other embodiments of the present invention include those wherein step (a) comprises providing a system wherein the optical polarizer comprises a non-polarizing beam splitter and first and second polarizing beam splitters, the non-polarizing beam splitter adapted for dividing the return beam into first and second beams respectively directed to the first and second polarizing beam splitters, the first polarizing beam splitter having an optical axis oriented at 45° to a horizontal position and directing first and second beams exiting therefrom onto respective first and second photodetectors, the second polarizing beam splitter having an optical axis oriented at 0° to a horizontal position and directing third and fourth beams exiting therefrom onto respective third and fourth photodetectors; and step (b) comprises correlating the intensity of each of the first, second, third, and fourth exiting beams detected by the respective first, second, third, and fourth photodetectors with the light polarization orientation of the return beam.

Preferably, step (a) comprises providing a system wherein the optical beam source comprises a laser, the at least one photodetector comprises a quadrant detector device, and the system further comprises:

(vi) at least one lens for collimating and/or focusing of at least one of the beams; and (vii) an amplifier with an input electrically connected to an output of the at least one photodetector.

Additional advantages and features of the present invention will become readily apparent to those skilled in the art from the following detailed description, wherein only the preferred embodiments of the present invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawings and description are to be regarded as illustrative in nature, and not as limitative.

BRIEF DESCRIPTION OF THE DRAWINGS

The following detailed description of the embodiments of the present invention can best be understood when read in conjunction with the following drawings, in which the same reference numerals are employed throughout for designating similar features and the various features are not necessarily drawn to scale but rather are drawn as to best illustrate the pertinent features, wherein:

FIG. 1 is an illustration for comparing data/information encoding densities of conventional optical recording media and multi-states ONS media according to the invention;

FIG. 2 illustrates cross-sectional system views and plan views of encoded surfaces of several types of conventional optical recording media and multi-states ONS media according to the invention;

FIG. 3(A) schematically illustrates the layout of a typical optical read-out system utilized with conventional optical media;

FIG. 3(B) is a simplified plan view of a quadrant-type photodetector utilized in the system of FIG. 3(A);

FIG. 4 is a plot illustrating the polarization angle θ of elliptically polarized light to be determined according to the present invention;

FIG. 5 schematically illustrates the layout of a single photodetector read-out system for determining the polarization angle θ of elliptically polarized light reflected from a multi-states ONS medium according to a first embodiment of the present invention;

DETAILED DESCRIPTION OF THE INVENTION

Figure 6:
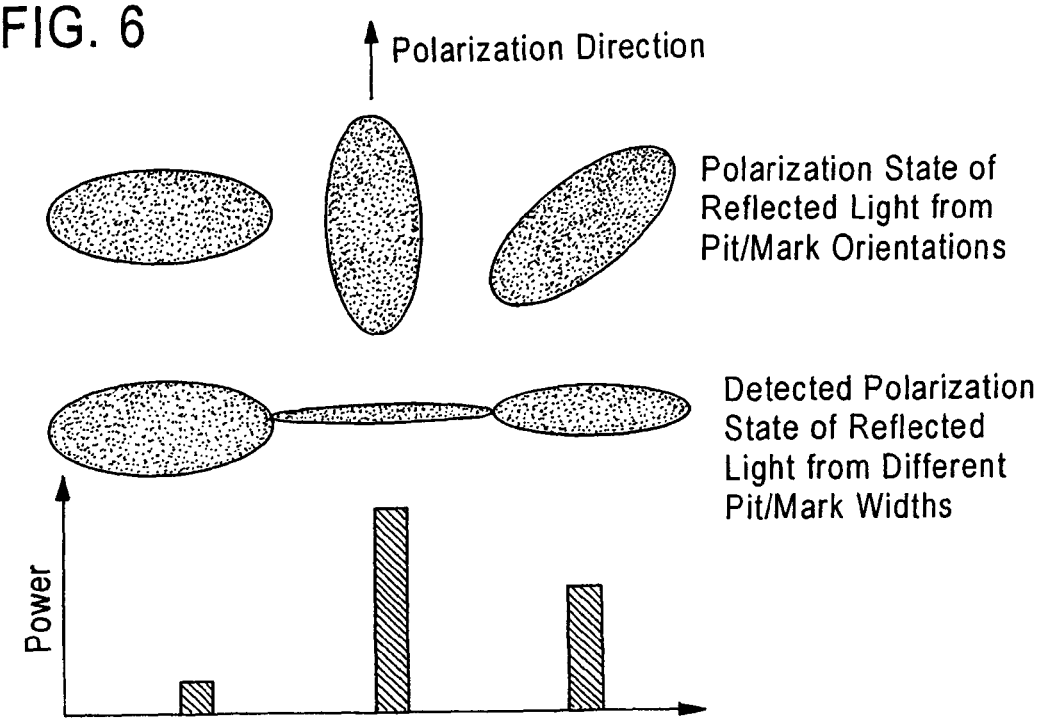
FIG. 6 schematically illustrates schematically shows the modulation of the power of detected reflected polarized light from a multi-states ONS medium as a function of several exemplary orientations and widths of the encoded nano-scale pits or marks of the medium.

As indicated above, and in contrast with conventional optical disc technology for data/information storage and retrieval, ONS optical disc technology utilizes discs with angularly oriented and/or width-modulated marks or pits in the disc surface for data/information encoding. As a consequence, a read head of ONS-based devices/systems must generate output signals which indicate changes or shifts in the polarization state or angle θ of the reflected (or "return") light $2_R$. Referring to FIG. 4, shown therein is a plot illustrating the polarization angle θ of elliptically polarized light to be determined according to the present invention, wherein θ is the angle between the x axis and the major axis of the ellipse defined by the polarized light. The present invention, therefore, has as a principal aim, provision of optical read-out systems designed and configured for optimally resolving changes in angles/orientations of reflected polarized light from the data marks or pits of ONS media.

Adverting to FIG. 5, schematically illustrated therein is the optical/electrical layout of a single photodetector read-out system 20 for determining the polarization angle θ of elliptically polarized light reflected from a multi-states ONS optical disc medium 7' according to a first embodiment of the present invention. As may be evident from a comparison of FIGS. 3 and 5, read-out system 20 for ONS disc media 7' according to the invention differs in essential respect from read-out system 10 for conventional optical disc media 7 by the presence of an optical polarizer element or system 14 in the optical path of the return beam $2_R$ between the focusing optics 8 and photo-detector 9. According to this embodiment, the optical polarizer element or system 14 is comprised of linear polarizer 15 which directs the return beam $2_R$ onto quadrant-type photo-detector 9 for providing an amplitude modulated output correlated to variation of the angular orientation of the walls and/or the width of the pits or marks in the surface of ONS disc 7'.

More specifically, according to the embodiment, when incident light 2 (which may be either polarized or non-polarized) from laser diode source 1 impinges the surface of ONS medium 7' with a plurality of angularly oriented and/or width-modulated pits or marks, the amplitude of the return beam $2_R$ changes in either the TE polarization direction/oreintation or the TM polarization direction/orientation. The combination of linear polarizer 15 and photodetector 9 according to the invention enables detection of the amplitude modulation due to polarization changes of the reflected light $2_R$ arising from different angular orientations and/or widths of the pits or marks encoded in the surface of the ONS medium 7'. By way of illustration, FIG. 6 schematically shows the modulation of the power of detected reflected polarized light from a multi-states ONS medium as a function of several exemplary orientations and widths of the encoded nano-scale pits or marks of the medium.

Figure 7:
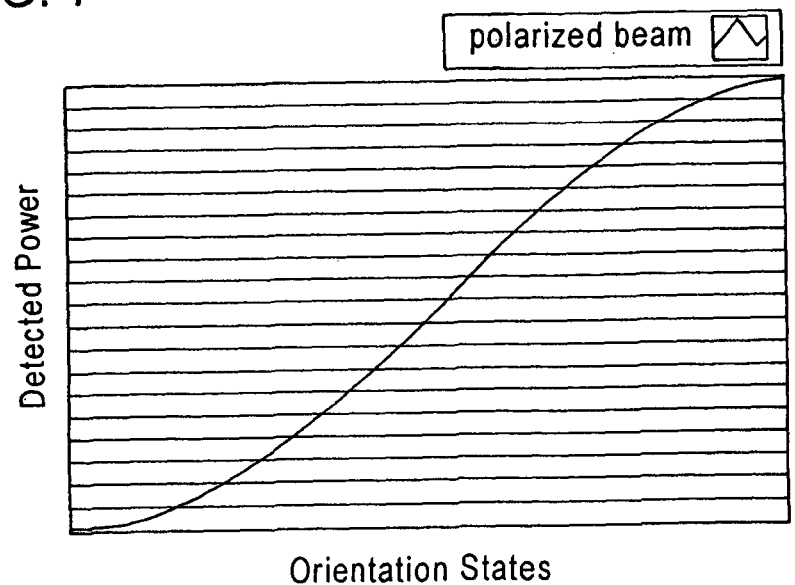
FIG. 7 is a graph for illustrating the variation/modulation of the power of detected reflected polarized light from a multi-states ONS medium as a function of 20 different orientation states of the encoded nano-scale pits or marks of the medium.

Once the range of amplitude modulation is determined for an ONS disc and read-out system such as system 20, multiple threshold values of output signal magnitude can be established for determining the state (i.e., angular orientation and/or width) of the pits or marks. For example, FIG. 7 illustrates the variation/modulation of the power of detected reflected polarized light from a multi-states ONS medium as a function of 20 different orientation states of the encoded nano-scale pits or marks of the medium.

Figure 8:
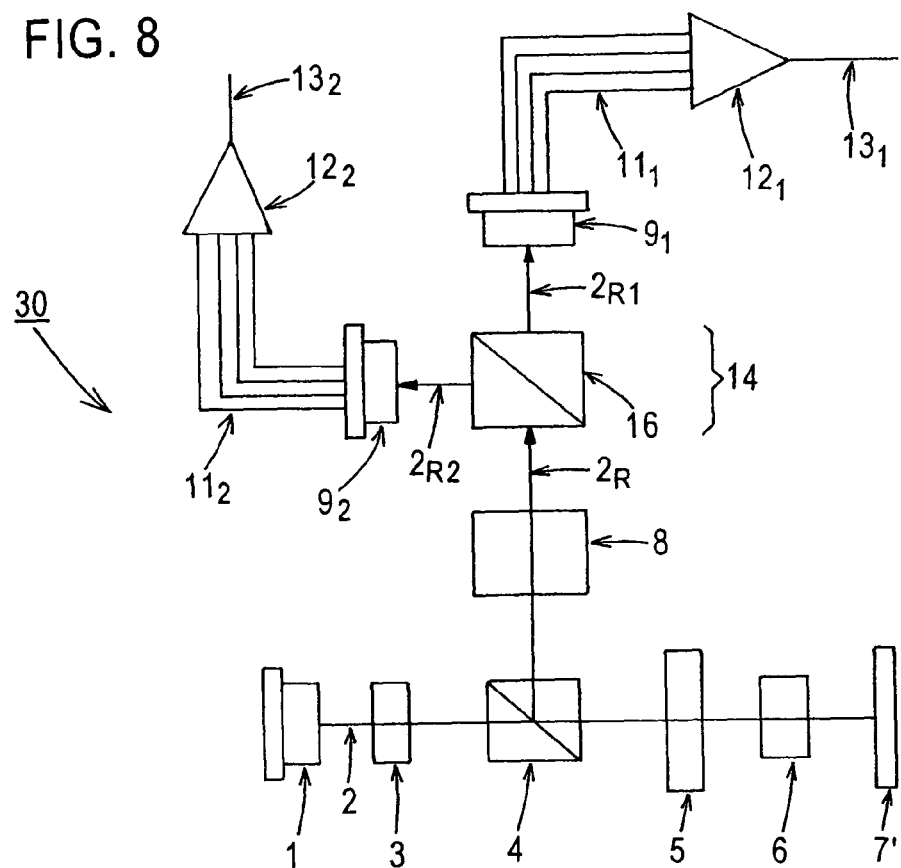
FIG. 8 schematically illustrates the layout of 2-photodector read-out systems for determining the polarization angle θ of elliptically polarized reflected light from a multi-states ONS medium according to second and third embodiments of the present invention.

With reference to FIG. 8, schematically illustrated therein is the optical/electrical layout of 2-photodector read-out systems 30 for determining the polarization angle θ of elliptically polarized light reflected from ONS medium 7' according to second and third embodiments of the present invention. According to the second embodiment, the optical polarizer element or system 14 interposed in the optical path of the return beam $2_R$ between the focusing optics 8 and the photo-detector 9 comprises a polarizing beam splitter 16 which divides the return beam $2_R$ into first and second linearly polarized beams $2_{R1}$ and $2_{R2}$ with a 90° difference in polarization angle, and each beam $2_{R1}$, $2_{R2}$ is directed therefrom onto a respective photodetector $9_1$, $9_2$; whereas, according to a third embodiment of the present invention, the optical polarizer element or system 14 interposed in the optical path of the return beam $2_R$ between the focusing optics 8 and the photo-detector 9 comprises a polarizing beam splitter 16 which divides the return beam into first and second linearly polarized beams $2_{R1}$ and $2_{R2}$ with a 45° difference in polarization angle, and each beam $2_{R1}$, $2_{R2}$ is directed therefrom onto a respective photodetector $9_1$, $9_2$.

Splitting of the return beam $2_R$ into a pair of return beams $2_{R1}$ and $2_{R2}$ for detection by a respective pair of photodetectors $9_1$ and $9_2$ according to the second and third embodiments is advantageous vis-à-vis the single photodetector arrangement of the first embodiment in that simultaneous detection of the return beam light intensity from a pair of orthogonally positioned 2 photodetectors enables: (1) performance of a normalization process which provides more robust (i.e., definitive) determination of the states of the pits or marks; and (2) rejection of common-mode noise because of the differential signal obtainable from the pair of photodetectors.

Figure 9:
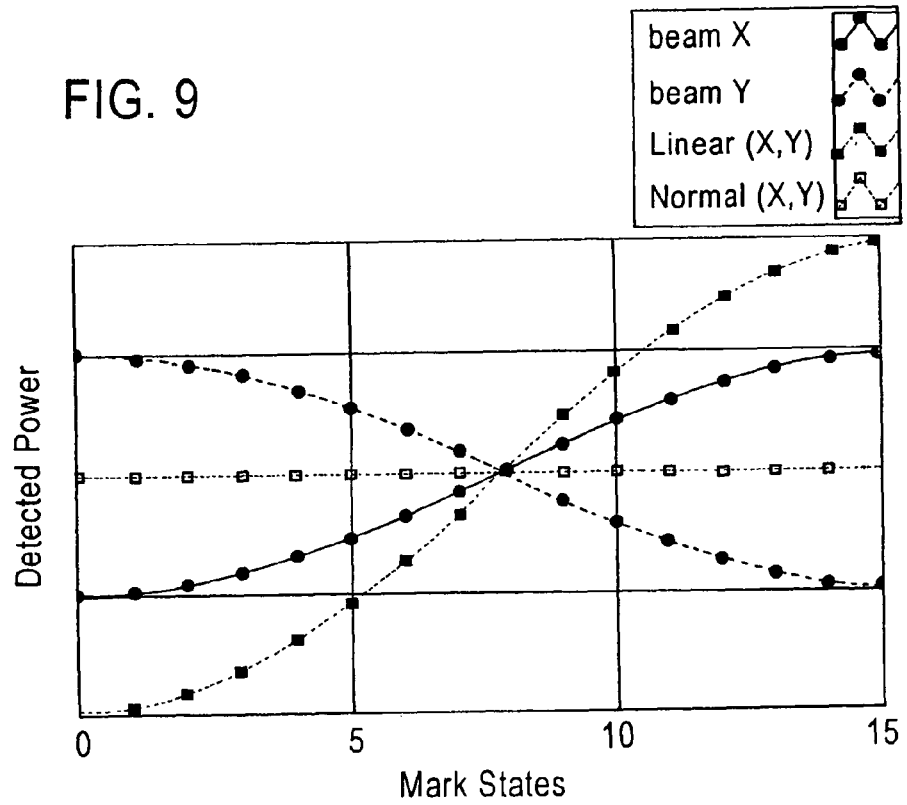
FIG. 9 is a graph for illustrating the variation/modulation of the power of detected reflected polarized light from a multi-states ONS medium as a function of the orientation state of the encoded nano-scale pits or marks of the medium, according to the second embodiment of the invention.
Figure 10:
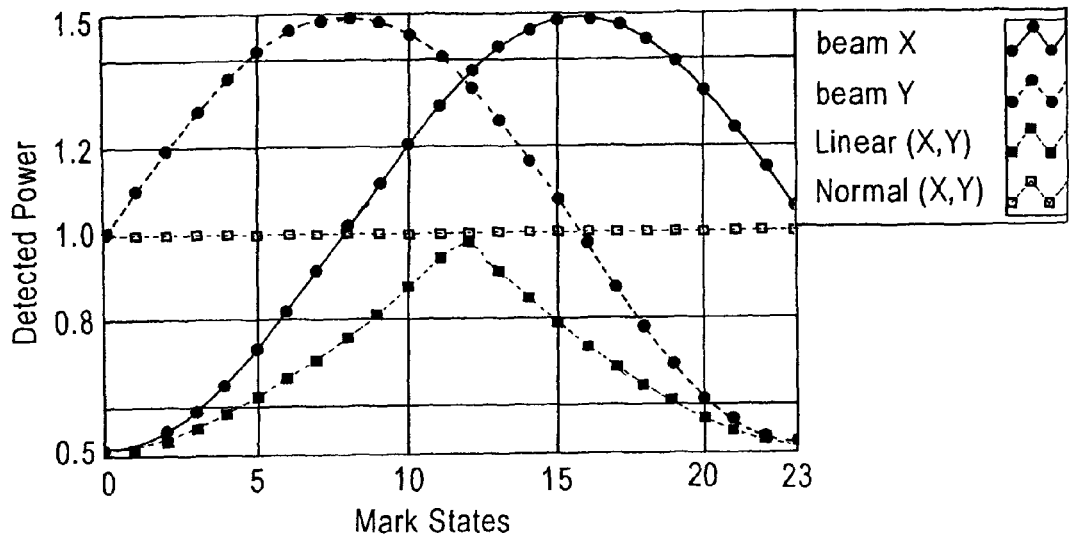
FIG. 10 is a graph for illustrating the variation/modulation of the power of detected reflected polarized light from a multi-states ONS medium as a function of the orientation state of the encoded nano-scale pits or marks of the medium, according to the third embodiment of the invention.

FIG. 9 is a graph illustrating the variation/modulation of the power of detected reflected polarized light from a multi-states ONS medium as a function of the orientation state of the encoded nano-scale pits or marks of the medium, according to the second embodiment of the invention, wherein the first and second linearly polarized beams $2_{R1}$ and $2_{R2}$ have a 90° difference in polarization angle; and FIG. 10 is a graph for illustrating the variation/modulation of the power of detected reflected polarized light from a multi-states ONS medium as a function of the orientation state of the encoded nano-scale pits or marks of the medium, according to the third embodiment of the invention, wherein the first and second linearly polarized beams $2_{R1}$ and $2_{R2}$ have a 45° difference in polarization angle.

As may be evident from a comparison of FIGS. 9 and 10, the third embodiment, wherein the first and second linearly polarized beams $2_{R1}$ and $2_{R2}$ have a 45° difference in polarization angle, is advantageous vis-à-vis the second embodiment, wherein the first and second linearly polarized beams $2_{R1}$ and $2_{R2}$ have a 90° difference in polarization angle, because: (1) the 45° difference in polarization angle allows the signal processing scheme to improve the linearization processing, thereby increasing the number of states which are resolvable for a given range of detectable light power or intensity; and (2) the resolvable pit or mark orientations are increased from 90° (as in the second embodiment) to 135°.

Figure 11:
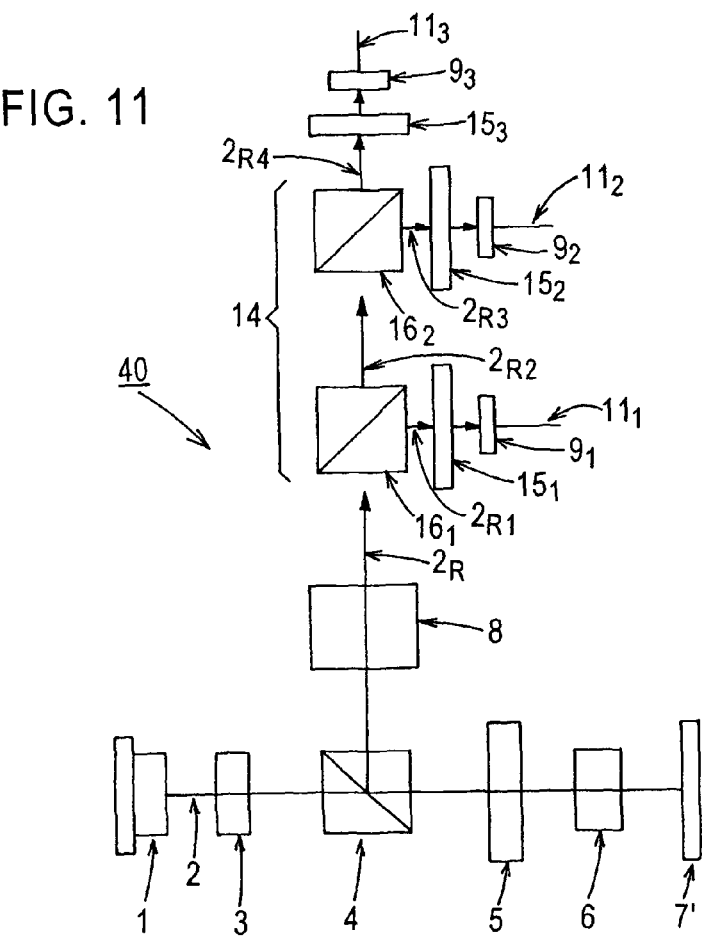
FIG. 11 schematically illustrates the layout of a 3-photodetector read-out system for determining the polarization angle θ of elliptically polarized reflected light from a multi-states ONS medium according to a fourth embodiment of the present invention.

Referring now to FIG. 11, schematically illustrated therein is the optical/electrical layout of a 3-photodetector read-out system 40 for determining the polarization angle θ of elliptically polarized reflected light from a multi-states ONS medium 7' according to a fourth embodiment of the present invention. As shown, according to this embodiment the optical polarizer element or system 14 interposed in the optical path of the return beam $2_R$ between the focusing optics 8 and the photodetector 9 comprises first and second non-polarizing beam splitters $16_1$ and $16_2$ and first, second, and third polarizing elements $15_1$, $15_2$, and $15_3$, wherein the first and second non-polarizing beam splitters $16_1$ and $16_2$ are positioned in optical series, the first beam splitter $16_1$ receives the return beam $2_R$ and divides it into: (1) a first beam $2_{R1}$ directed through the first polarizing element $15_1$ with a 120° rotation axis and onto a first photodetector $9_1$, and (2) a second beam $2_{R2}$ received by the second beam splitter $16_2$. The latter in turn divides the second beam $2_{R2}$ into third and fourth beams $2_{R3}$ and $2_{R4}$, the third beam $2_{R3}$ is then directed through the second polarizing element $15_2$ with a 60° rotation axis and onto a second photodetector $9_2$, and the fourth beam $2_{R4}$ is directed through the third polarizing element $15_3$ with a 0° rotation axis and onto a third photodetector $9_3$, wherein the intensity of each of said first, third, and fourth beams $2_{R1}$, $2_{R2}$, and $2_{R3}$ detected by the respective first, second, and third photodetectors $9_1$, $9_2$, and $9_3$ varies with the light polarization orientation of the return beam $2_R$.

Figure 12:
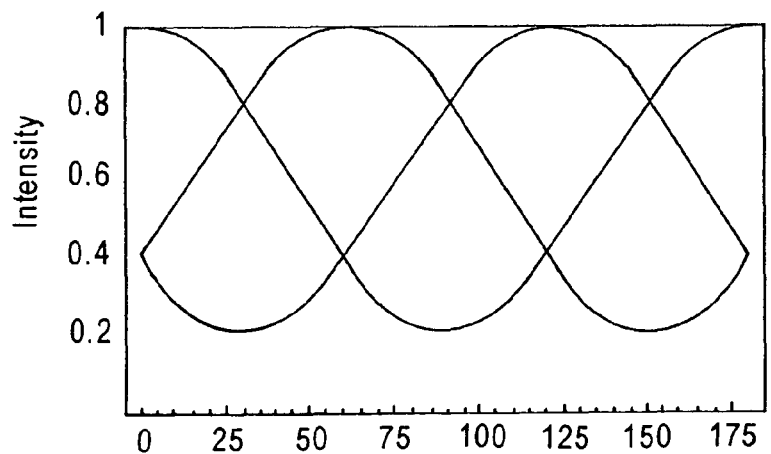
FIG. 12 is a graph for illustrating the variation/modulation of the intensity of the reflected polarized light received by each of the 3 photodetectors of the fourth embodiment of FIG. 11, as a function of the polarization angle θ.

FIG. 12 is a graph illustrating the variation/modulation of the intensity of the reflected polarized light received by each of the 3 photodetectors $9_1$, $9_2$, and $9_3$ of the fourth embodiment of FIG. 11, as a function of the polarization angle θ. While use of only one photodetector 9, as in the first embodiment shown in FIG. 5 and described above, cannot uniquely determine the intensity of the reflected polarized light, a system of 3 photodetectors $9_1$, $9_2$, and $9_3$ as provided for in the fourth embodiment is capable of uniquely determining the intensity of reflected polarized light for polarization angle θ in the range from 0-180°.

Figure 13:
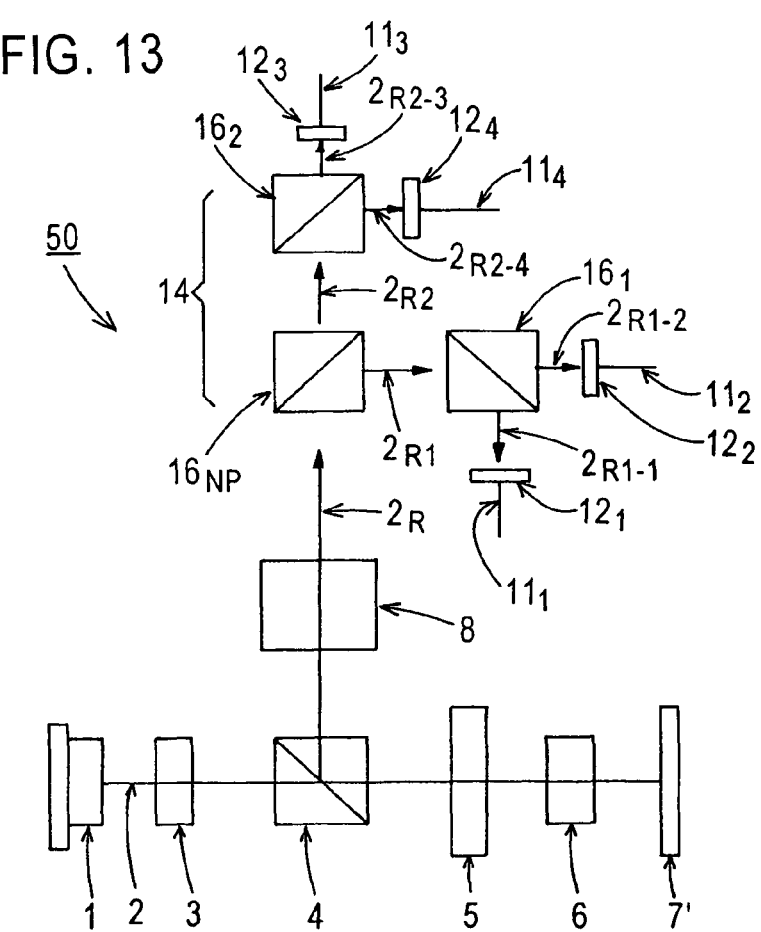
FIG. 13 schematically illustrates the layout of a 4-photodetector read-out system for determining the polarization angle θ of elliptically polarized reflected light from a multi-states ONS medium according to a sixth embodiment of the present invention.

With reference to FIG. 13, schematically illustrated therein is the optical/electrical layout of a 4-photodetector read-out system 50 for determining the polarization angle θ of elliptically polarized reflected light from a multi-states ONS medium according to a fifth embodiment of the present invention. According to this embodiment, the optical polarizer element or system 14 interposed in the optical path of the return beam $2_R$ between the focusing optics 8 and the photodetector 9 comprises a non-polarizing beam splitter $16_{NP}$ and first and second polarizing beam splitters $16_1$ and $16_2$, the non-polarizing beam splitter $16_{NP}$ receiving the return beam $2_R$ from the focusing optics 8 and dividing it into first and second beams $2_{R1}$ and $2_{R2}$ respectively directed to the first and second polarizing beam splitters $16_1$ and $16_2$, the first polarizing beam splitter $16_1$ having an optical axis oriented at 45° to a horizontal position and directing first and second beams $2_{R1-1}$ and $2_{R1-2}$ exiting therefrom onto respective first and second photodetectors $12_1$ and $12_2$. The second polarizing beam splitter $16_2$ has an optical axis oriented at 0° to a horizontal position and directs third and fourth beams $2_{R2-3}$ and $2_{R2-4}$ exiting therefrom onto respective third and fourth photodetectors $12_3$ and $12_4$, wherein the intensity of each of the first, second, third, and fourth exiting beams detected by the respective first, second, third, and fourth photodetectors varies with the light polarization orientation of the return beam.

Figure 14:
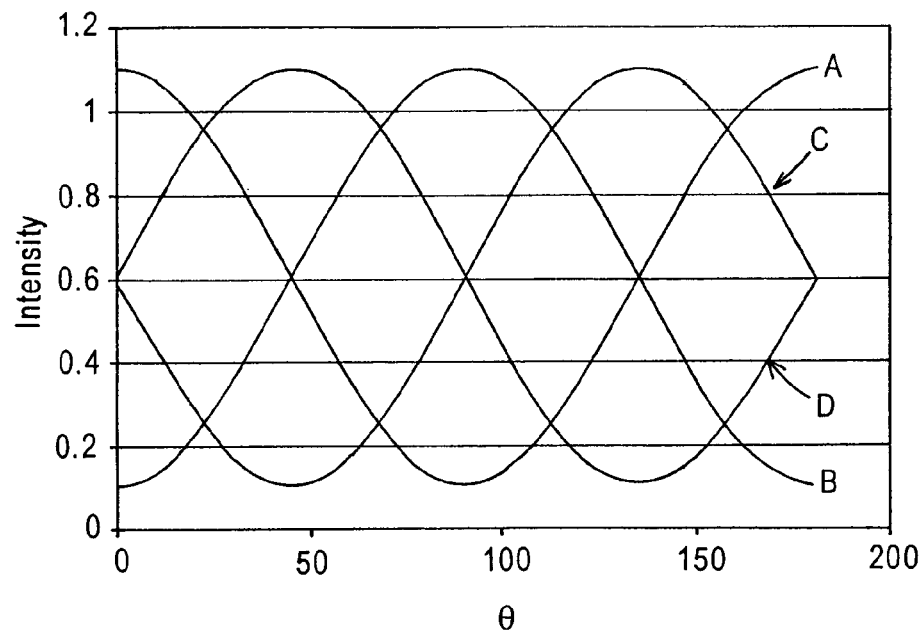
FIG. 14 is a graph for illustrating the variation/modulation of the intensity of the reflected polarized light received by each of the 4 photodetectors of the sixth embodiment of FIG. 15, as a function of the polarization angle θ.

FIG. 14 is a graph illustrating the variation/modulation of the intensity of the reflected polarized light beams received by each of the 4 photodetectors of the fifth embodiment as a function of the polarization angle θ. According to this embodiment, wherein references A, B, C, and D correspond to the respective intensities of the first beam $2_{R1-1}$, second beam $2_{R1-2}$, third beam $2_{R2-3}$, and fourth beam $2_{R2-4}$, it is expected that (A+B) and (C+D) is constant and usable for determination/examination of the total light intensity, whereas (A−B) and (C−D) are expected to remove the circularly polarized components of the light intensity. The variation of the intensities (A−B) and (C−D) as a function of polarization angle θ is graphically shown in FIG. 14, and it is evident that they are each in sine wave form offset from each other by 90°.

The total power (or intensity) P of the linearly polarized components may be calculated as $P=[(A-B)^2+(C-D)^2]^{1/2}$, which value P can be utilized for normalizing the respective powers or intensities, as follows: A'=A/P; B'=B/P; C'=C/P, and D'=D/P. A linearization scheme utilizing the normalized powers or intensities for improving the detector sensitivity at all polarization angles θ. One way for linearizing is to use the NPQ+Seamless scheme, wherein:

$$I(\theta)=[(A'-B')+(C'-D')]/[|(A'-B')+(C'-D')|+|(A'-B')-(C'-D')|]$$

Figure 15:
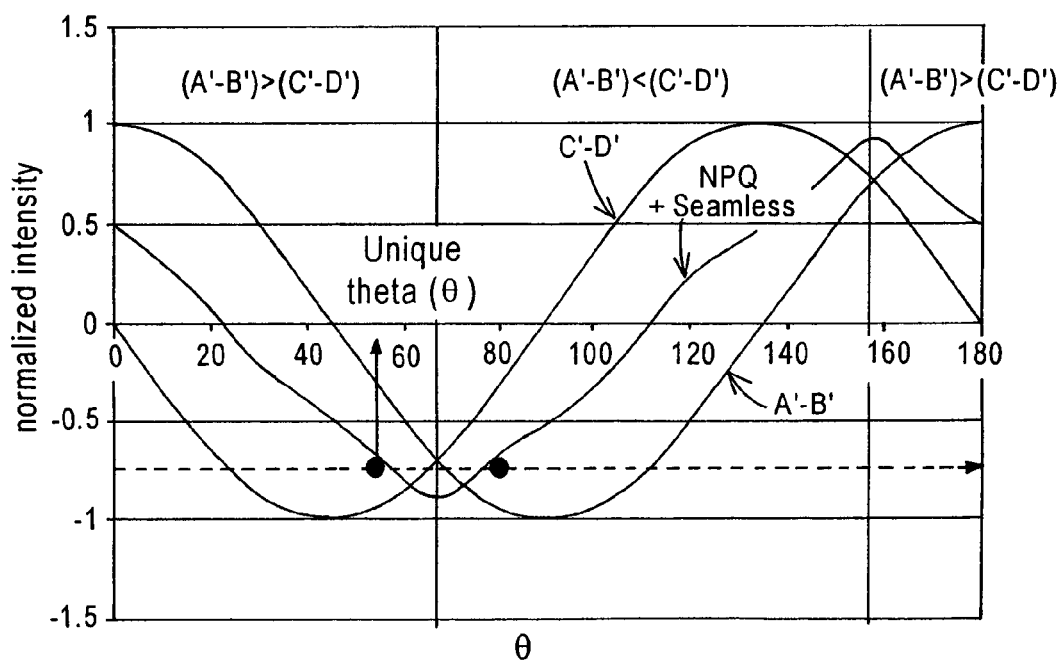
FIG. 15 is a graph for illustrating determination of a unique polarization angle θ from the variation/modulation of the intensity of the reflected polarized light received by each of the 4 photodetectors of the sixth embodiment by means of a linearization procedure.

Linearized curves obtained by the above method are also graphically shown in FIG. 15; however, it should be noted that "I" alone cannot uniquely determine θ, i.e., there are two values of θ corresponding to each value of I. In order to determine θ uniquely, the sign of (A'−B')−(C'−D') must be examined. Once the sign is known, θ can be uniquely determined.

It is further noted that read-out system 50 can be made compatible with DVD format detection schemes by summing the outputs from each of the detectors.

In the previous description, numerous specific details are set forth, such as specific materials, structures, processes, etc., in order to provide a better understanding of the present invention. However, the present invention can be practiced without resorting to the details specifically set forth. In other instances, well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein.

What is claimed is:
1. A system, comprising:
an optical beam source;
a stage adapted for mounting and rotating an optical disc medium about a central axis;
at least one photodetector;
a beam splitter positioned in an optical path between said optical beam source and said stage, for directing an incident beam of non-polarized light from said optical beam source onto said optical disc medium mounted on said stage and directing a return beam from said optical disc medium onto said at least one photodetector; and an optical polarizer positioned in an optical path between said beam splitter and said at least one photodetector, for detection and analysis of changes in polarization of said return beam effected by variation of the orientation of walls and/or widths of pits or marks of said optical disc medium, wherein:

said optical polarizer comprises a non-polarizing beam splitter and first and second polarizing beam splitters, said first polarizing beam splitter having an optical axis oriented at substantially 45° to a horizontal position, said second polarizing beam splitter having an optical axis oriented at substantially 0° to a horizontal position; and the intensity of first, second, third, and fourth exiting beams detected by respective first, second, third, and fourth photodetectors varies with the light polarization orientation of said return beam.

2. The system as in claim 1, wherein:
said optical polarizer comprises a polarizing beam splitting prism which divides said return beam into a pair of linearly polarized beams with a 45° difference in polarization angle, and each beam is directed therefrom onto a respective photodetector.

3. The system as in claim 1, wherein:
said non-polarizing beam splitter is adapted for receiving said return beam and dividing it into said first and second beams respectively directed to said first and second polarizing beam splitters, said first polarizing beam splitter directing first and second beams exiting therefrom onto respective first and second photodetectors, said second polarizing beam splitter directing third and fourth beams exiting therefrom onto respective third and fourth photodetectors.

4. The system as in claim 1, wherein:
said optical beam source comprises a laser.

5. The system as in claim 1, wherein:
said at least one photodetector comprises a quadrant detector device.

6. The system as in claim 1, further comprising:
at least one lens for collimating and/or focusing of at least one of said beams; and
an amplifier with an input electrically connected to an output of said at least one photodetector.

7. A method, comprising:
providing a system including:
an optical beam source;
a stage mounting thereon an optical disc medium for rotation about a central axis;
at least one photodetector;
a beam splitter positioned in an optical path between said optical beam source and said stage, for directing an incident beam of non-polarized light from said optical beam source onto said optical disc medium and directing a return beam from said optical disc medium onto said at least one photodetector; and
an optical polarizer positioned in an optical path between said beam splitter and said at least one photodetector, for detection and analysis of changes in polarization of said return beam effected by variation of the orientation of walls and/or widths of pits or marks of said optical disc medium, wherein said optical polarizer comprises a non-polarizing beam splitter and first and second polarizing beam splitters, said first polarizing beam splitter having an optical axis oriented at substantially 45° to a horizontal position, said second polarizing beam splitter having an optical axis oriented at substantially 0° to a horizontal position; and determining orientation and/or width of pits or marks by correlating the intensity of first, second, third, and fourth exiting beams detected by the respective first, second, third, and fourth photodetectors with the light polarization orientation of said return beam.

8. The method according to claim 7, wherein:
said providing comprises providing a system wherein said optical polarizer comprises a polarizing beam splitter which divides said return beam into a pair of linearly polarized beams with a 45° difference in polarization angle, and each beam is directed therefrom onto a respective photodetector.

9. The method according to claim 7, wherein:
said non-polarizing beam splitter is adapted for receiving said return beam and dividing it into said first and second beams respectively directed to said first and second polarizing beam splitters, said first polarizing beam splitter directing first and second beams exiting therefrom onto respective first and second photodetectors, said second polarizing beam splitter directing third and fourth beams exiting therefrom onto respective third and fourth photodetectors.

10. The method according to claim 7, wherein:
said optical beam source comprises a laser.

11. The method according to claim 7, wherein:
said at least one photodetector comprises a quadrant detector device.

12. The method according to claim 7, wherein:
said system further comprises:
at least one lens for collimating and/or focusing of at least one of said beams; and
an amplifier with an input electrically connected to an output of said at least one photodetector.

13. A system, comprising:
an optical beam source;
a stage adapted for mounting and rotating an optical disc medium about a central axis;
at least one photodetector;
a beam splitter positioned in an optical path between said optical beam source and said stage, for directing an incident beam of non-polarized light from said optical beam source onto said optical disc medium mounted on said stage and directing a return beam from said optical disc medium onto said at least one photodetector; and
an optical polarizer positioned in an optical path between said beam splitter and said at least one photodetector, for detection and analysis of changes in polarization of said return beam effected by variation of the orientation of walls and/or widths of pits or marks of said optical disc medium, wherein:

said optical polarizer comprises a non-polarizing beam splitter and first and second polarizing beam splitters, said first polarizing beam splitter having an optical axis oriented at substantially 45° to a horizontal position, said second polarizing beam splitter having an optical axis oriented at substantially 0° to a horizontal position.

* * * * *